(12) United States Patent
Sonoura

(10) Patent No.: US 8,209,074 B2
(45) Date of Patent: Jun. 26, 2012

(54) ROBOT AND METHOD FOR CONTROLLING THE SAME

(75) Inventor: Takafumi Sonoura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1178 days.

(21) Appl. No.: 12/068,347

(22) Filed: Feb. 5, 2008

(65) Prior Publication Data

US 2008/0201014 A1    Aug. 21, 2008

(30) Foreign Application Priority Data

Feb. 16, 2007    (JP) ................. 2007-036612

(51) Int. Cl.
*G01C 22/00* (2006.01)
*G05D 1/00* (2006.01)

(52) U.S. Cl. .......................................... 701/23; 701/28

(58) Field of Classification Search ............... 700/253, 700/255, 245, 258, 259; 382/153; 701/23; 901/46, 1

See application file for complete search history.

(56) References Cited

U.S. PATENT DOCUMENTS

| | | | | |
|---|---|---|---|---|
| 5,570,285 | A * | 10/1996 | Asaka et al. ............ | 701/23 |
| 6,760,647 | B2 * | 7/2004 | Nourbakhsh et al. ...... | 700/245 |
| 7,684,894 | B2 * | 3/2010 | Sakai et al. ............ | 700/245 |
| 2006/0100742 | A1 * | 5/2006 | Park .................... | 700/259 |

FOREIGN PATENT DOCUMENTS

| | | |
|---|---|---|
| JP | 03-282711 | 12/1991 |
| JP | 10-312218 | 11/1998 |
| JP | 2000-202790 | 7/2000 |
| JP | 2002-059820 | 2/2002 |
| JP | 2004-280451 | 10/2004 |
| JP | 2004-326264 | 11/2004 |
| JP | 2005-310043 | 11/2005 |

OTHER PUBLICATIONS

Machine Translation of JP 10-312218, published Nov. 24, 1998.*
Japanese Office Action dated Jun. 21, 2011 in Application No. 2007-036612 with partial English language translation.

* cited by examiner

*Primary Examiner* — Mary Cheung
*Assistant Examiner* — Kyle K Tsui
(74) *Attorney, Agent, or Firm* — Nixon & Vanderhye, P.C.

(57) ABSTRACT

A robot includes: a main body; a traveling mechanism attached to the main body to move the main body; an image pickup device which picks up an image of an object in a space including a traveling plane; an object detector which detects the object existing in the space based on an image picked up by the image pickup device; a distance calculator which calculates a distance to the object detected by the object detector; a degree of caution setting device which sets a degree of caution with respect to the object detected by the object detector based on the image picked up by the image pickup device and the distance calculated by the distance calculator; and a controller which controls the traveling mechanism based on the degree of caution set by the degree of caution setting device and the distance calculated by the distance calculator.

3 Claims, 12 Drawing Sheets

| Distance which can be ensured between robot and obstacle \ Approach permission distance limitation | | | Vx | | |
|---|---|---|---|---|---|
| No limitations | $V_0$ | $V_0$ | $V_0$ | $V_0$ | $V_0$ |
| Less than $L_4$ | $V_1''''$ | $V_0$ | $V_0$ | $V_0$ | $V_0$ |
| Less than $L_3$ | $V_2''''$ | $V_1'''$ | $V_0$ | $V_0$ | $V_0$ |
| Less than $L_2$ | $V_3''''$ | $V_2'''$ | $V_1''$ | $V_0$ | $V_0$ |
| Less than $L_1$ | $V_4''''$ | $V_3'''$ | $V_2''$ | $V_1'$ | $V_0$ |
|  | Lv.4 (such as child) | Lv.3 (such as human being) | Lv.2 (such as traveling object) | Lv.1 (such as stationary object) | None (there are no obstacles) |

$$\left\{ V_4^n \leq V_3^n \leq V_2^n \leq V_1^n \leq V_0 \atop V_0 : \text{MAXIMUM VELOCITY IN STANDARD TRAVELING} \right.$$

→ SET ($V_{max} = V_x$)

FIG. 12

ROBOT AND METHOD FOR CONTROLLING THE SAME

CROSS-REFERENCE TO RELATED APPLICATION

This application is based upon and claims the benefit of priority from prior Japanese Patent Application No. 2007-36612 filed on Feb. 16, 2007 in Japan, the entire contents of which are incorporated herein by reference.

BACKGROUND OF THE INVENTION

1. Field of the Invention

The present invention relates to a robot and its control method.

2. Related Art

In the conventional art, the robot searches for information concerning an obstacle around the robot by using an outside world sensor such as an ultrasonic wave sensor or a range finder. If an unexpected obstacle is detected, the robot operates to avoid the obstacle while decelerating (see, for example, JP-A 2005-310043 (KOKAI)). If the obstacle proves to be a traveling object, the robot assumes an action strategy of continuing to stop until the traveling object disappears from the vicinity of the robot (see, for example, JP-A 3-282711 (KOKAI)).

The robot observes a time change value of the information obtained from the outside world sensor in order to determine whether the obstacle is a traveling object. By in addition conducting image processing such as template matching or optical flow using a camera, the robot makes a decision whether the obstacle is a traveling object or makes a decision whether the obstacle is a human being in some cases. However, more detailed sorting and analysis are hardly conducted.

An obstacle discrimination technique utilizing height information of the obstacle is also known (see, for example, JP-A 2004-326264 (KOKAI)). According to the technique described in JP-A 2004-326264 (KOKAI), however, the height information is used to detect a stationary environmental obstacle, such as a wall or a pillar, or a human being. In JP-A 2004-326264 (KOKAI), a technique for detecting the posture state of a human being is mentioned, but discrimination of the human being including the degree of caution is not taken into consideration. Furthermore, JP-A 2004-326264 (KOKAI) discloses an obstacle detection and discrimination technique, and a concrete operation change technique against the obstacle is not presented.

Introduction of autonomous traveling objects such as robots into stores is under study. Considering the introduction of robots into general environments such as stores or facilities, however, it becomes important to ensure safety of the robots. Especially in the environment in the state of coexistence with human beings, it is necessary to take safety operation for human being's recognition and human beings who perform recognition. On the other hand, it is also necessary to ensure the basic performance, such as smooth traveling operation, of the robots, and trade off between the safety and the traveling performance occurs.

When a robot has detected a human being, the robot stops on the spot and waits for the human being to go away from the vicinity of the robot, or the robot avoids the with a sufficient spacing between, under present conditions. In a narrow place such as a store, however, it is difficult to ensure a sufficient spacing and consequently the robot cannot help stopping and letting the human being go past. In such an operation strategy, however, the work efficiency of the robot is poor and the robot cannot withstand practical use.

As one of reasons why only such a control technique can be used, it can be mentioned that information concerning other traveling objects the robot can know is little and an action control law which can be applied to all detected persons is used.

SUMMARY OF THE INVENTION

The present invention has been made in view of these circumstances, and an object thereof is to provide a robot which performs safe operation and has a high business capability in stores, and a control method for such a robot.

According to an aspect of the present invention, there is provides a robot including: a main body; a traveling mechanism configured to be attached to the main body and to move the main body; an image pickup device configured to pick up an image of an object in a space including a traveling plane; an object detector configured to detect the object existing in the space based on an image picked up by the image pickup device; a distance calculator configured to calculate a distance to the object detected by the object detector; a degree of caution setting device configured to set a degree of caution with respect to the object detected by the object detector based on the image picked up by the image pickup device and the distance calculated by the distance calculator; and a controller configured to control the traveling mechanism based on the degree of caution set by the degree of caution setting device and the distance calculated by the distance calculator.

According to an another aspect of the present invention, there is provided a control method for a robot including a main body, a traveling mechanism configured to be attached to the main body and to move the main body, an image pickup device configured to pick up an image of an object in a space including a traveling plane, an object detector configured to detect the object existing in the space based on an image picked up by the image pickup device, a distance calculator configured to calculate a distance to the object detected by the object detector, and a controller configured to control the traveling mechanism, the control method including: setting a degree of caution with respect to the object detected by the object detector based on the image picked up by the image pickup device and the distance calculated by the distance calculator; and causing the controller to control the traveling mechanism based on the degree of caution and the distance calculated by the distance calculator.

BRIEF DESCRIPTION OF THE DRAWINGS

FIG. 12 is a diagram showing a traveling restriction law used by a robot according to an embodiment.

DESCRIPTION OF THE EMBODIMENTS

Figure 1:
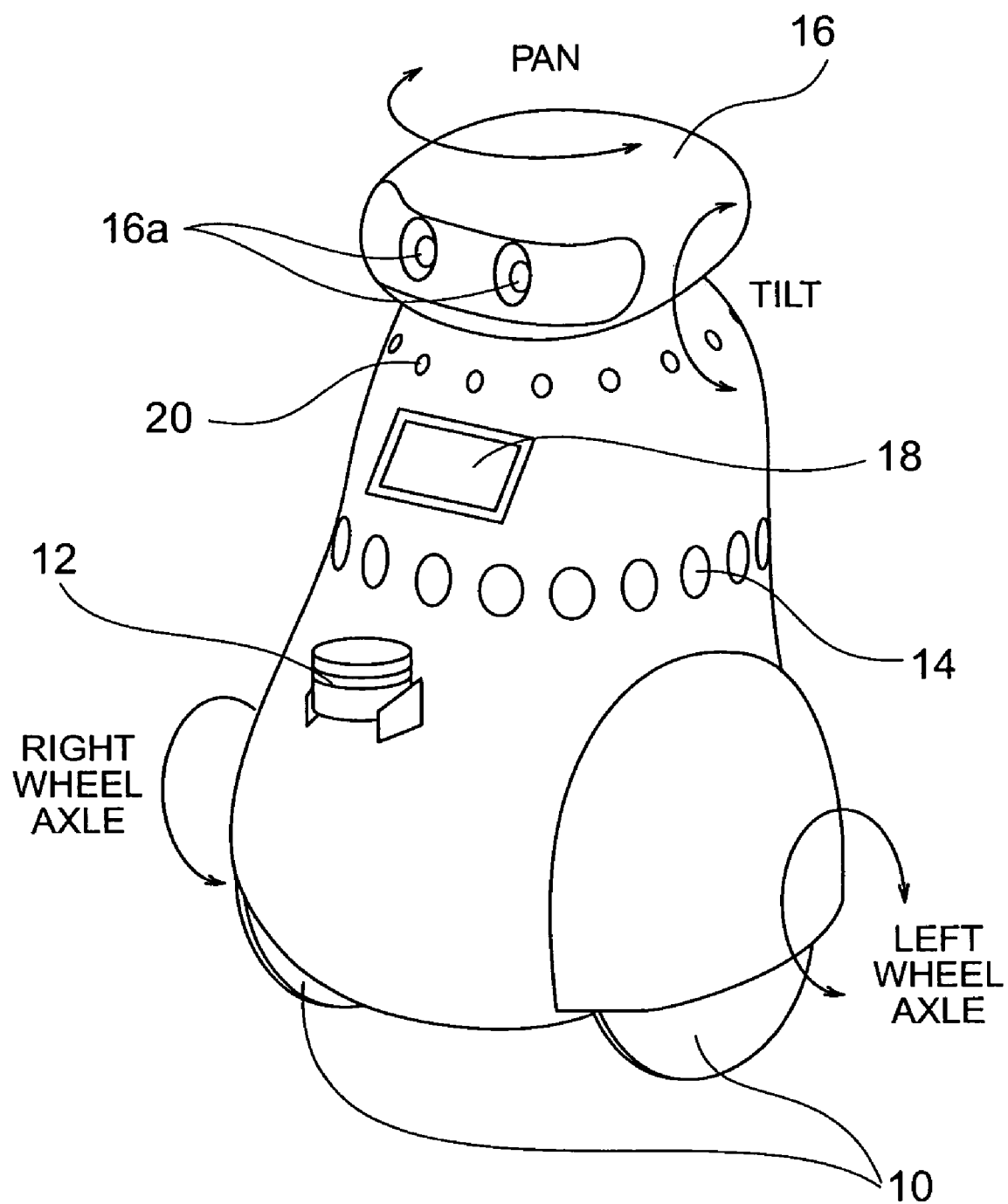
FIG. 1 is a perspective view of a robot according to an embodiment of the present invention.

A robot according to an embodiment of the present invention is shown in FIG. 1. A robot 1 according to the present embodiment is a robot of independent two-wheel drive type having drive wheels 10 on the right and the left and free casters (not illustrated) in front and in the rear. As a result, the robot 1 can move in the space freely. In other words, only the left wheel or the only the right wheel can be rotated around a left wheel axle and a right wheel axle, respectively.

A monitor, an input keyboard and a mouse can be connected to the robot 1. As a result, it becomes possible to present internal information of the robot 1 to the outside and transmit external intention to the robot 1. The robot 1 has a function of displaying a virtual space divided into unit grids on the monitor. The robot 1 has a function of allowing a manager to form a region in the virtual space by successively linking grid intersections with the mouse. The robot 1 has a function of allowing the manager to generate some spaces and divide and couple the spaces. Furthermore, the robot 1 has a function of causing the robot 1 to recognize a traveling space structure of itself by specifying whether the region is a region where the robot 1 can travel.

The robot 1 has a laser range finder 12. Topography around the robot 1 can be measured accurately by using the laser range finder 12. Ultrasonic wave sensors 14 are installed on the circumference of the trunk of the robot 1. A distance to an obstacle in the sensor installation direction can be measured by an ultrasonic wave sensor 14 as well. The robot 1 further has two cameras 16a. A distance to the obstacle in a direction viewed from the cameras 16a can also be calculated by calculating the distance in the depth direction of the image with stereo viewing using the cameras 16a. The depth distance in the camera angle of view may also be measured by using a distance image sensor which is not illustrated.

Furthermore, the number of revolutions of the wheels 10 is measured by an encoder. The location of the robot 1 is estimated by accumulating the number of revolutions and successively calculating the path of the wheels 10. The robot 1 has a radio signal sender (not illustrated) besides. A plurality of antennas installed in the space receive a radio wave signal with an identification ID emitted from the robot 1. An environment system installed in the space estimates a radio wave sending source on the basis of received strength distribution at this time. An estimation device regards the location of the radio wave sending source as the location of the robot 1 itself. In addition, a plurality of radio wave senders in each of which the installation location information is already known and the sending time and code of the sending signal can be discriminated are installed in a store. The robot 1 has an antenna (not illustrated) which can receive signals from these senders. The robot 1 can also estimate the location of itself on the basis of information of these kinds as in the GPS (Global Position System).

The robot 1 can also recognize a traveling space structure of itself by autonomously wandering about in an unknown space, detecting the surrounding topography on the basis of a relative location from a base point and a distance from an obstacle in the surroundings estimated from an input of an outside world sensor at that time, and traveling and searching in the whole region in the traveling space.

The robot 1 has a camera unit 16 in its head. As for the camera unit 16, the camera posture can be controlled in the pan direction and the tilt direction independently of the trunk movement.

The robot 1 generates a traveling route along which the robot 1 can reach a destination without colliding with a wall or a pillar, on the basis of map information.

The robot 1 has a touch panel 18 on its trunk. An external intention can also be input via the touch panel 18. The robot 1 has a plurality of microphones 20 on its trunk. An external intention can also be input to the robot 1 by voice via the microphones 20.

In the present embodiment, the robot 1 is supposed to travel in a store.

Upon detecting an obstacle, the robot 1 changes its operation according to the kind of the obstacle. Operation decision flows at this time become as shown in FIGS. 2 to 9. The robot 1 makes a decision whether there is an obstacle by using the outside world sensor such as the laser range finder 12 (step S1 in FIG. 2). The decision whether there is an obstacle is made, for example, as shown in FIG. 3.

First, a distance $d(\phi)$ to an object in a detection direction $\phi$ of the outside world sensor is measured (step S11 in FIG. 3). The distance $d(\phi)$ is compared with an obstacle decision threshold D (step S12 in FIG. 3). If the distance $d(\phi)$ is equal to or greater than the obstacle decision threshold D, then the object is not judged to be an obstacle (step S13 in FIG. 3), and an approach permission distance $L_{max}$ between the robot 1 and an obstacle is set to $L_{max}=0$ without placing a limitation on $L_{max}$ (step S2 in FIG. 2).

If the distance $d(\phi)$ is less than the obstacle decision threshold D, then the robot 1 proceeds to step S14 shown in FIG. 3. At the step S14, a distance $L(\phi)$ to a wall or a pillar in the detection direction $\phi$ and an object marked on a map is calculated on the basis of map data the robot 1 has and the current location and posture of the robot 1, and $d(\phi)$ is compared with $L(\phi)$. If the distance $d(\phi)$ substantially coincides with $L(\phi)$, the detected object is judged to be a topography obstacle (step S15 in FIG. 3). If the distance $d(\phi)$ is longer than the distance $L(\phi)$, then the robot 1 judges its own location to be recognized falsely and conducts re-identification of its own location (step S15 in FIG. 3). On the other hand, if the distance $d(\phi)$ is shorter than the distance $L(\phi)$, then the robot 1 recognizes the object as an unexpected obstacle which is not on the map (step S16 in FIG. 3). The decision whether there is an obstacle is thus finished.

Figure 2:
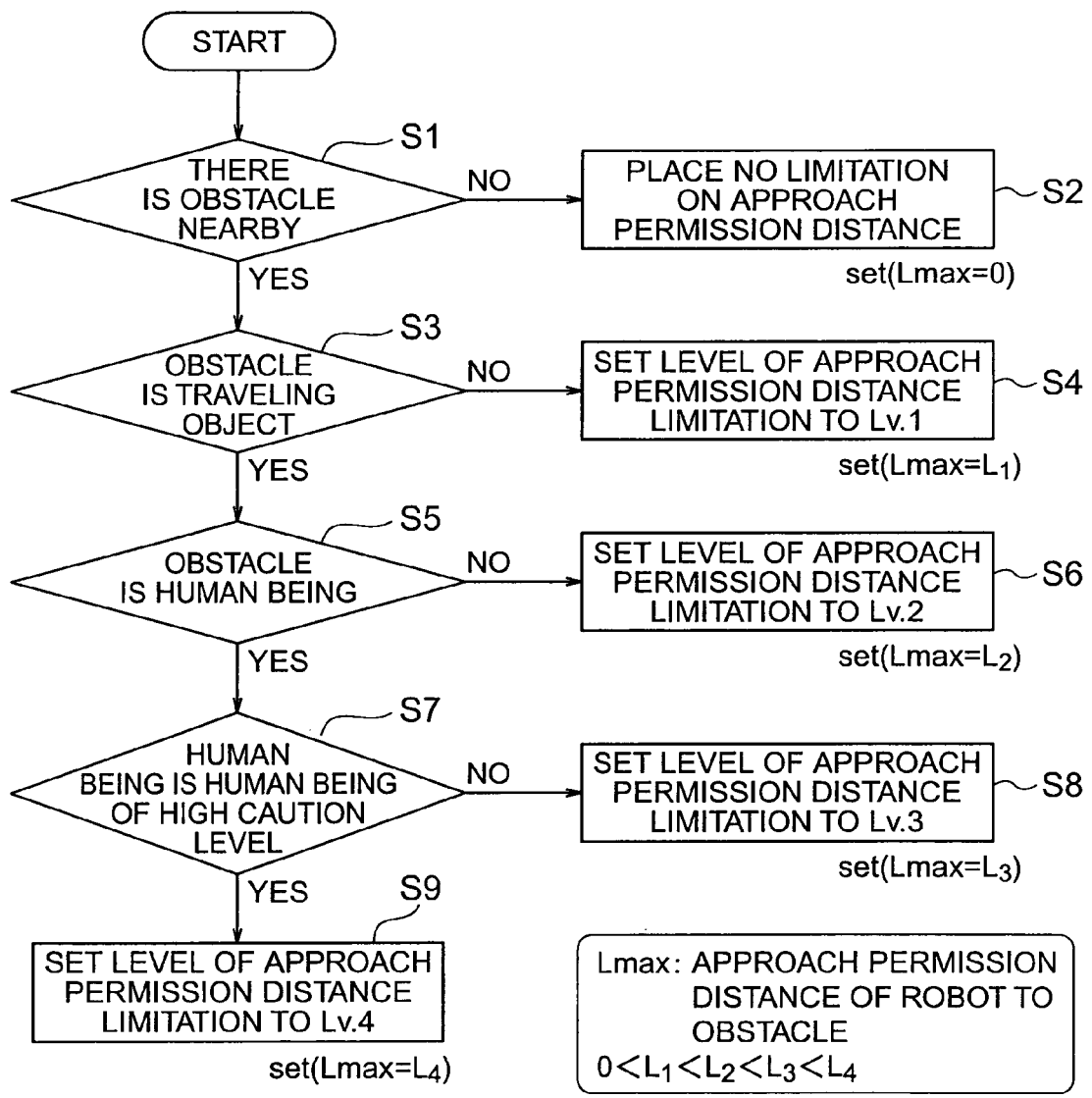
FIG. 2 is a flow chart showing operation of a robot according to an embodiment.
Figure 3:
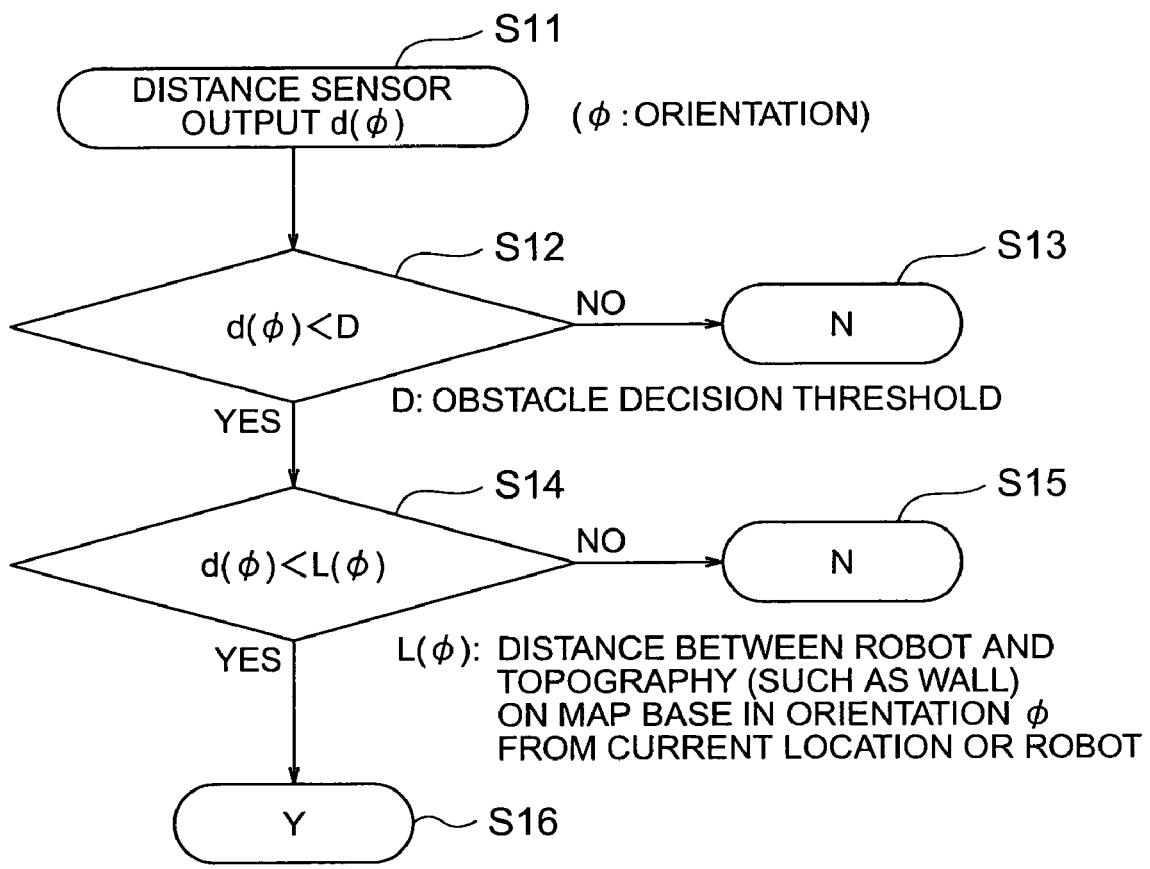
FIG. 3 is a flow chart showing a decision operation conducted in a robot according to an embodiment to determine whether an object is an obstacle.

If the robot 1 recognizes the obstacle as an unexpected obstacle, then the robot 1 proceeds to step S3 shown in FIG. 2 to make a decision whether the obstacle is a traveling object. The decision whether the obstacle is a traveling object is made, for example, as shown in FIG. 4.

Figure 4:
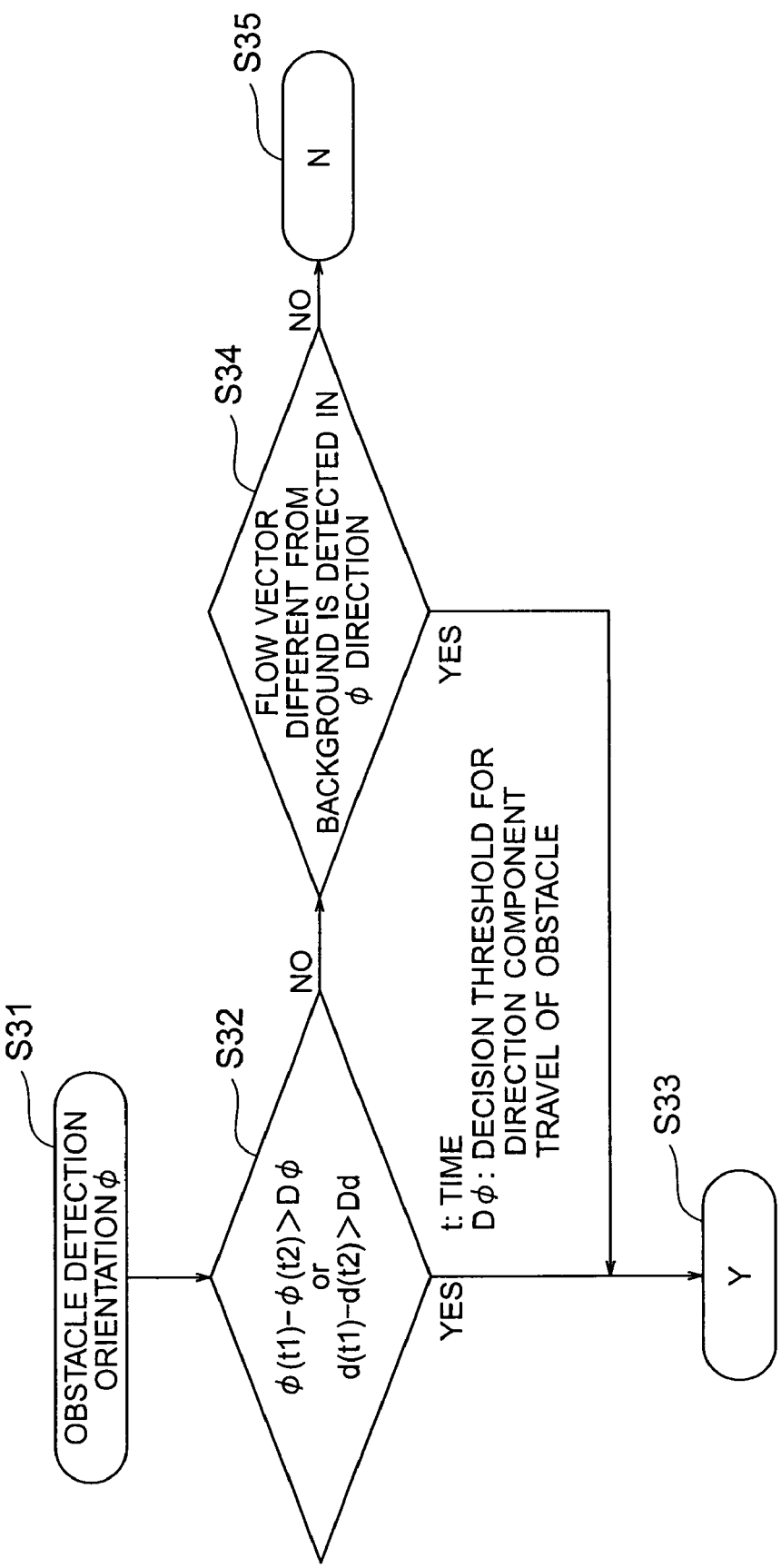
FIG. 4 is a flow chart showing a decision operation conducted in a robot according to an embodiment to determine whether an obstacle is a traveling object.

First, a search is conducted in that direction $\phi$ by using the outside world sensor again (step S31 in FIG. 4). A decision is made whether there is a change in distance or direction to the obstacle with time elapse (step S32 in FIG. 4). For example, a difference between an orientation $\phi(t1)$ of the obstacle at time t1 and an orientation $\phi(t2)$ of the obstacle at time t2 preceding the time t1, i.e. an orientation change is represented as φ(t1)−φ(t2). And a difference between a distance d(t1) to the obstacle and a distance d(t2), i.e., a distance change is represented as d(t1)−d(t2). A decision whether the difference φ(t1)−φ(t2) and the difference d(t1)−d(t2) are respectively greater than decision thresholds Dφ and Dd is made at step S32. If the difference φ(t1)−φ(t2) and the difference d(t1)−d(t2) are respectively greater than the decision thresholds Dφ and Dd, then the robot 1 proceeds to step S33 and the obstacle is judged to be a traveling object. If the robot 1 itself travels at this time, the orientation change and the distance change are corrected according to a change in its own location.

On the other hand, if the orientation change and the distance change are respectively equal to or less than the decision thresholds Dφ and Dd, then the robot 1 turns the cameras to the direction, acquires an image, measures an optical flow from the image picked up by the cameras, and makes a decision whether a flow vector different from the background is detected in the obstacle detection direction (step S34 in FIG. 4). If a flow vector different from the background is detected, then the robot 1 proceeds to step S33 shown in FIG. 4 and the obstacle is judged to be a traveling object. If the flow vector is not detected, then the robot 1 proceeds to step S35 and the obstacle is judged not to be a traveling object. In this case, the robot 1 proceeds to step S4 shown in FIG. 2, sets the level of the approach permission distance limitation (degree of caution) of the robot 1 to the obstacle to Lv. 1, and sets the approach permission distance $L_{max}$ to $L_{max}=L_1$ (>0). The decision whether the obstacle is a traveling object is thus finished.

If the robot 1 recognizes the obstacle as a traveling object, then the robot 1 proceeds to step S5 shown in FIG. 2 and the robot 1 makes a decision whether the obstacle is a human being. This decision is made, for example, as shown in FIG. 5.

Figure 5:
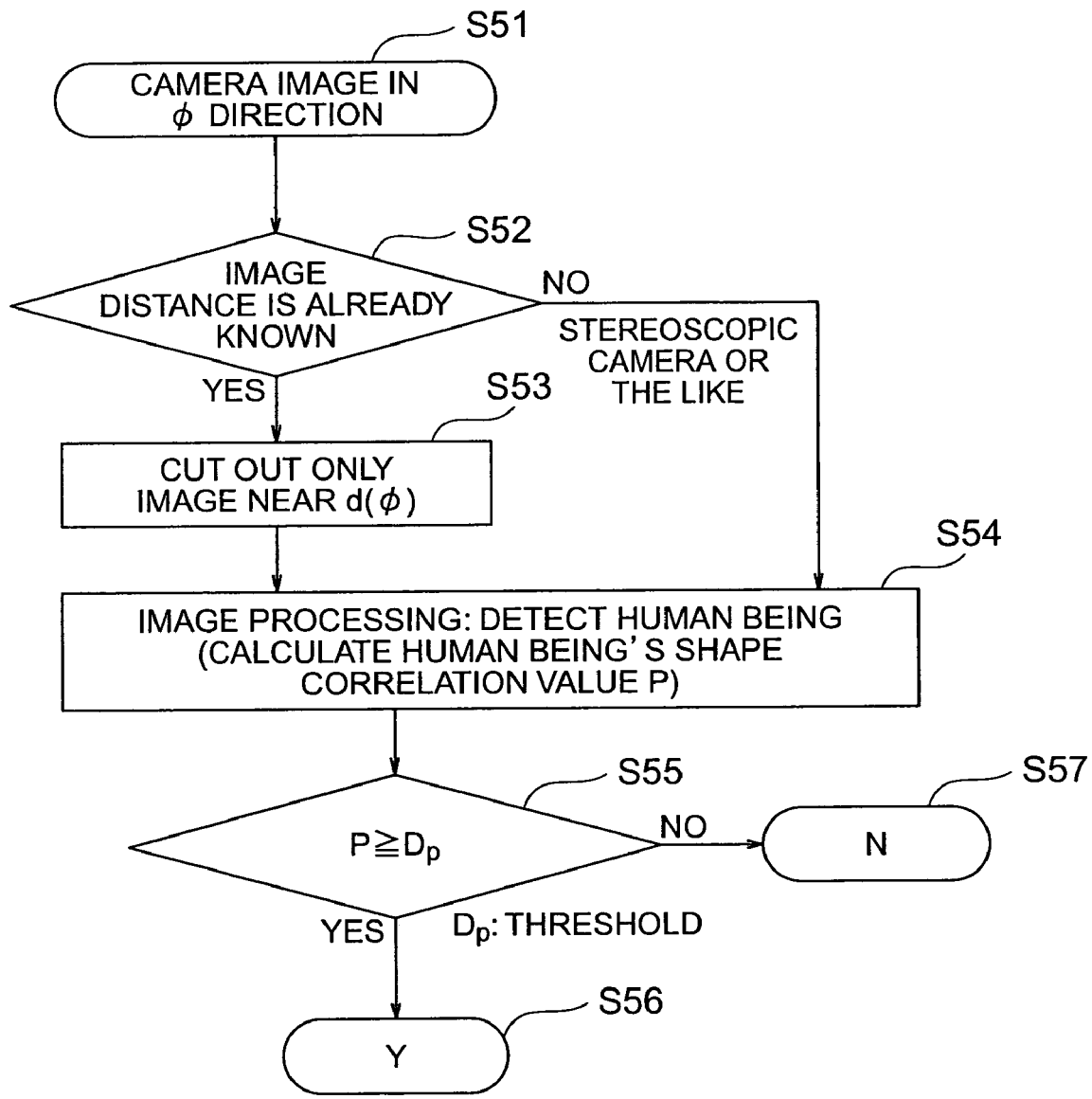
FIG. 5 is a flow chart showing a decision operation conducted in a robot according to an embodiment to determine whether an obstacle is a human being.

First, the robot 1 makes a decision whether an image distance is already known on the basis of an image picked up by the cameras in the φ direction (steps S51 and S52 in FIG. 5). If the image distance is already known, then the robot 1 proceeds to step S53 shown in FIG. 5, cuts out only an image near the distance d(φ) to the obstacle, and then proceeds to step S54 shown in FIG. 5. If the image distance is not already known (for example, if the camera is a stereoscopic camera), then the robot 1 proceeds to step S54 shown in FIG. 5.

In the step S54 shown in FIG. 5, the robot 1 conducts image processing and calculates a human being's shape correlation value P. In other words, if the robot 1 has a distance image sensor, the robot 1 detects a contour shape. If the robot 1 detects a traveling object from the flow vector, then the robot 1 conducts contour extraction processing on its detected peripheral region, conducts template matching with a human being shape pattern retained within the robot 1 as already known information, and calculates the human being's shape correlation value P. Subsequently, the robot 1 proceeds to step S55 shown in FIG. 5, and compares the human being's shape correlation value P with a threshold Dp. If the human being's shape correlation value P is equal to or greater than the threshold Dp, then the robot 1 proceeds to step S56 shown in FIG. 5 and judges the obstacle to be a human being. On the other hand, if the human being's shape correlation value P is less than the threshold Dp, then the robot 1 proceeds to step S57 shown in FIG. 5 and judges the obstacle not to be a human being. In this case, the robot 1 proceeds to step S6 shown in FIG. 2, sets the level of the approach permission distance limitation (degree of caution) of the robot 1 to the obstacle to Lv. 2, and sets the approach permission distance $L_{max}$ to $L_{max}=L_2$ (>$L_1$). The human being's shape correlation value P can be obtained by matching pixel color information in a peripheral region from which the flow vector has been detected with color information of a skin color series. Even if the human being's shape correlation value P is not obtained, the traveling object may be judged to a human being in the case where feature points such as eyes, a nose and a mouth and their geometrical arrangements are confirmed near a head in a traveling object image region. The decision whether the obstacle is a human being is thus finished.

Figure 6:
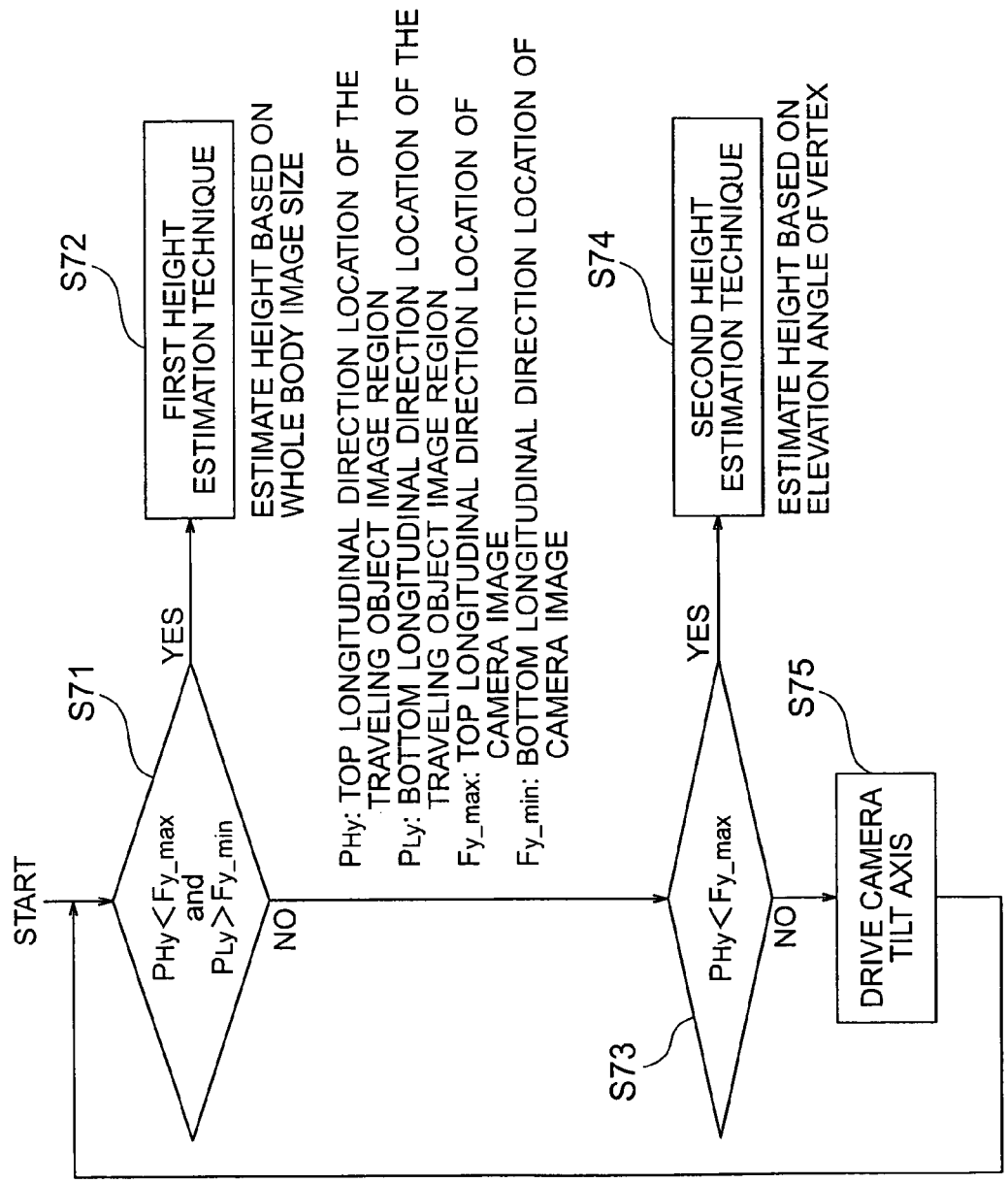
FIG. 6 is a flow chart showing a decision operation conducted in a robot to determine whether a detected human being is a human being of a high caution level.
Figure 7:
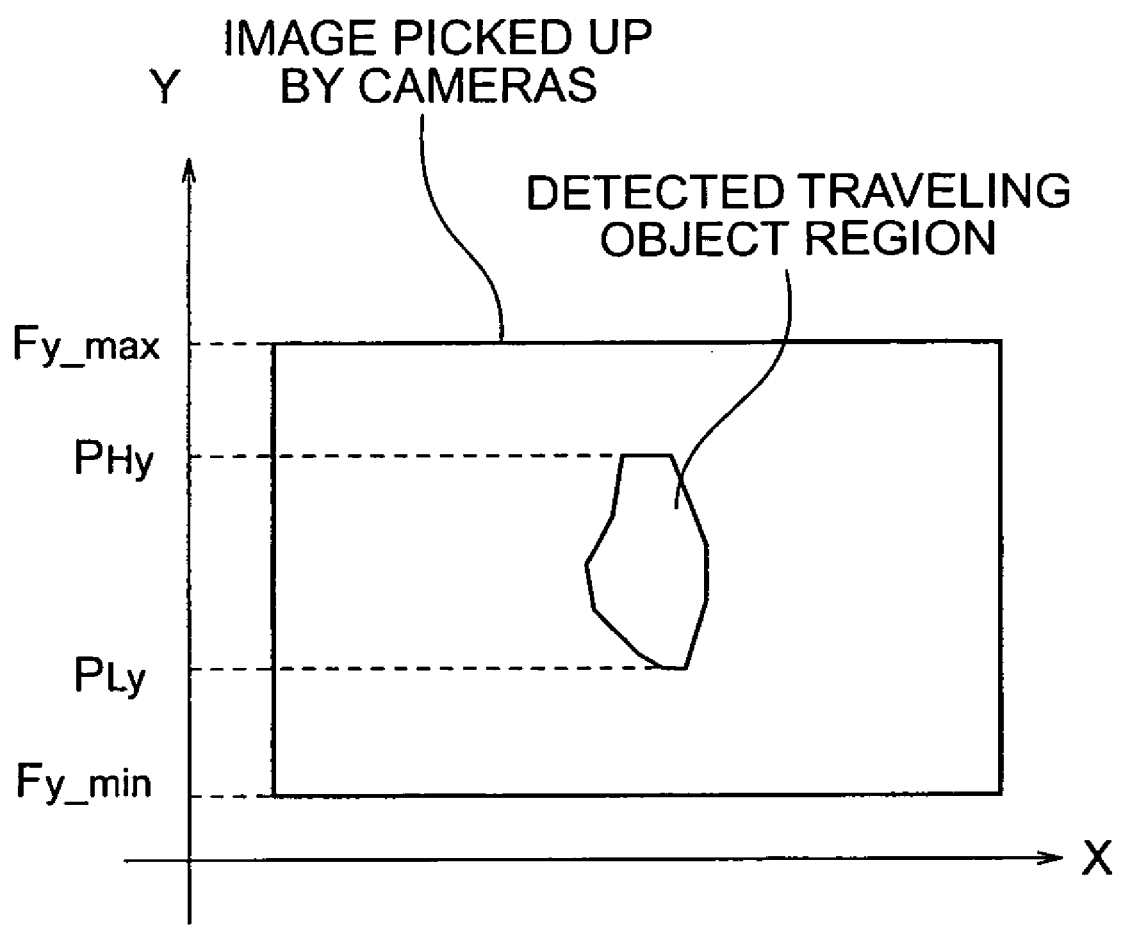
FIG. 7 is a schematic diagram showing a detected traveling object region in an image picked up by a camera.

Subsequently, the robot 1 proceeds to step S7 shown in FIG. 2, and makes a decision whether the traveling object recognized as a human being is a human being of high caution level, i.e., a human being which is higher in caution level than a general human being. Since the robot 1 in the present embodiment has means for detecting information of the distance to the traveling object, the actual size of the traveling object can be estimated on the basis of the information of the distance to the traveling object and the image size of the traveling object. The decision whether the traveling object is a human being of high caution level is made, for example, as shown in FIG. 6. The decision operation shown in FIG. 6 is made supposing that the human being of high caution level is a child.

First, the robot 1 proceeds to step S71 shown in FIG. 6 and makes a decision whether an image in a longitudinal direction of a human being picked up is accommodated in a picked-up image region on the basis of the image picked up by the cameras. This decision is made as described hereafter. The robot 1 finds a top longitudinal direction location PHy and a bottom longitudinal direction location PLy in an image region of the traveling object and a top location Fy_max and a bottom location Fy_min of the camera image shown in FIG. 7, and makes a decision whether PHy<Fy_max and PLy>Fy_min (step S71 in FIG. 6). If the image in the longitudinal direction of the human being picked up is accommodated in the picked-up image region, then the robot 1 proceeds to step S72 and estimates the height of the human being picked up, by using a first height estimation technique which will be described later. If the image in the longitudinal direction of the human being picked up is not accommodated in the picked-up image region, then the robot 1 proceeds to step S73 shown in FIG. 6 and makes a decision whether a head of the human being picked up is accommodated in the picked-up image region. This decision is made by determining whether the relation PHy<Fy_max is satisfied. If the relation PHy<Fy_max is satisfied, then the robot 1 proceeds to step S74 shown in FIG. 6 and estimates the height of the human being picked up, by using a second height estimation technique which will be described later. If the relation PHy<Fy_max is not satisfied, then the robot 1 drives tilt axes of the cameras and moves the cameras upward in the tilt direction so as to prevent the traveling object image region from protruding from the visual field of the cameras as regards at least the upward direction (Step S75. Thereafter, the robot 1 picks up the image of the traveling object (human being) again, takes in the picked-up image, returns to the step S71 shown in FIG. 6, and repeats the above-described operation.

The above-described first height estimation technique will now be described with reference to FIGS. 8 and 9. The robot 1 in the present embodiment has a table showing correspondence between an image region height P|y| according to the distance d(φ) to the traveling object and a real height to the traveling object. In the first height estimation technique, therefore, the robot 1 measures the bottom location PLy and the top location PHy shown in FIG. 7 as regards the vertical direction of the screen of the picked-up image region of the detected person, and estimates the height of the detected person on the basis of a correspondence table according to a distance between objects (=PHy−PLy) at that time. The estimation of the height is conducted as described hereafter. First, the height h of the person is estimated on the basis of the extracted person's image and the distance d(φ) to the person (steps S711 and S712 in FIG. 8). This estimation is conducted on the basis of a table showing correspondence between an image region height P|y| and a real height h of the actual obstacle (person) as shown in FIG. 9. The estimated height h is compared with a threshold Dh (for example, an average height value of the lowest grades of elementary schools (for example, ten-year-old children)) at step S713 shown in FIG. 8. If the height h is greater than the threshold Dh, then the robot 1 proceeds to step S714 shown in FIG. 8 and judges that the extracted person is not a person of caution level. In this case, the robot 1 further proceeds to step S8 shown in FIG. 2, sets the level of the approach permission distance limitation (degree of caution) of the robot 1 to the person to Lv. 3, and sets the approach permission distance $L_{max}$ to $L_{max}=L_3$ (>$L_2$).

Figure 8:
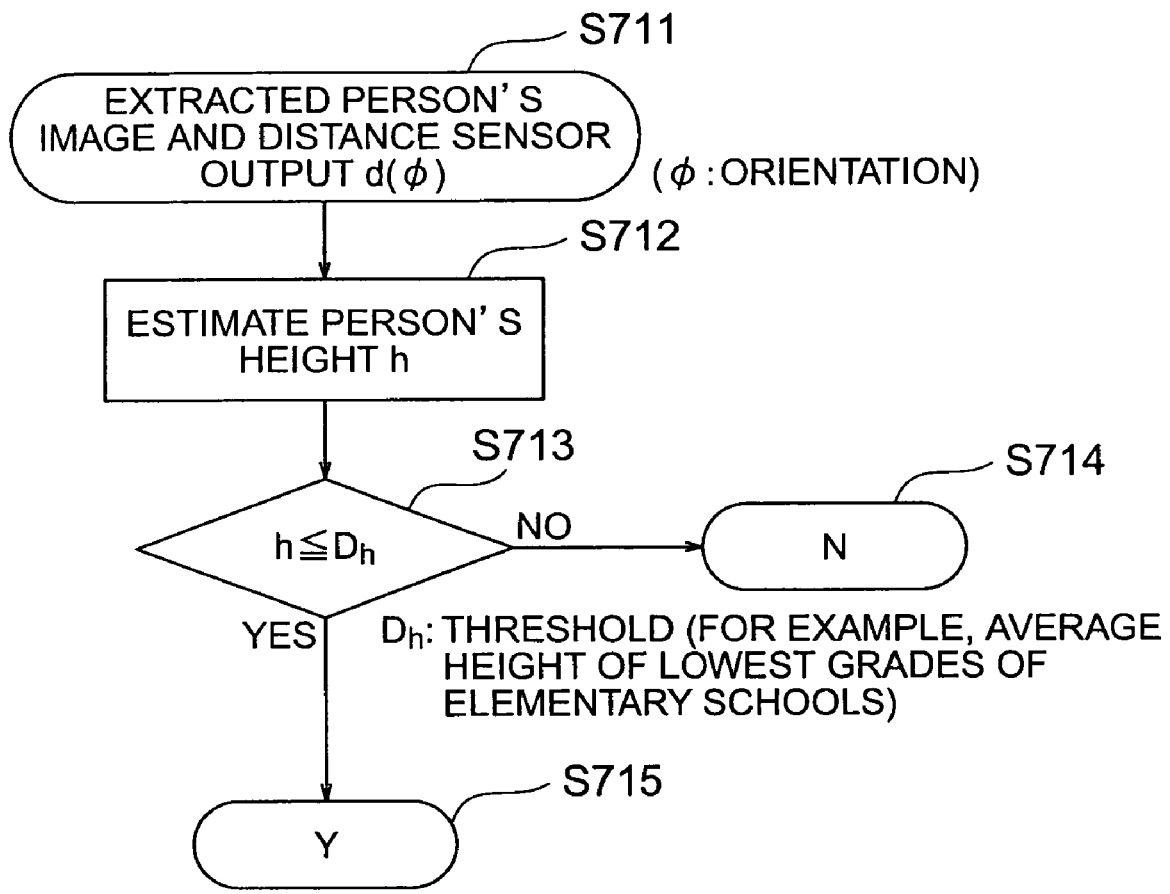
FIG. 8 is a flow chart for explaining a first human being's height estimation technique.
Figure 9:
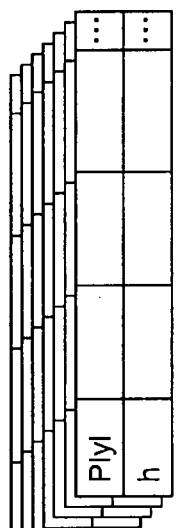
FIG. 9 is a diagram for explaining a table showing correspondence between an image region height P|y| according to a distance $d(\phi)$ to a traveling object and a real height to the traveling object.

On the other hand, if the height h is equal to or less than the threshold Dh, then the robot 1 proceeds to step S715 shown in FIG. 8 and judges that the extracted person is a person of high caution level, i.e., a person who is higher in caution level than general persons. In this case, the robot 1 further proceeds to step S9 shown in FIG. 2, sets the level of the approach permission distance limitation (degree of caution) of the robot 1 to the person to Lv. 4, and sets the approach permission distance $L_{max}$ to $L_{max}=L_4$ (>$L_3$).

By the way, in the first height estimation technique, a linear or non-linear correspondence function may be prepared instead of the above-described correspondence table. Strictly speaking, the first height estimation technique can be used only when the whole of the traveling object is accommodated in the pick-up screen of the cameras. It is permissible that the traveling object slightly gets out of the pick-up screen as regards the lateral direction of the traveling object. As regards the vertical direction of the traveling object, however, it is necessary that the traveling object is accommodated in the screen.

The above-described second height estimation technique will now be described with reference to FIGS. 10 and 11. The second height estimation technique is an estimation technique to be used when the bottom point of the image region of the detected traveling object reaches the bottom side of the image picked up by the cameras, i.e., when the traveling object protrudes from the visual field of the cameras in the downward direction of the screen. According to the second height estimation technique, the robot 1 finds a relative elevation angle or a relative depression angle α of the top point "a" of the pick-up image region of the traveling object from the optical axis of the cameras shown in FIG. 11, finds a relative posture relation (here, an angle β in the tilt direction) between a camera pan tilt head and a robot main body on the basis of an inner world sensor such as an encoder, estimates an actual height h of the point "a" on the basis of installation states of the robot main body, the camera pan tilt head and the outside world sensor previously stored as already known information, the distance information d(φ) obtained by using the outside world sensor, and the geometric relations (steps S721 and S722 in FIG. 10), and regards the actual height h of the point "a" as the person's height. In the present embodiment, a traveling object in a store is considered. Therefore, every person detected as a traveling object is supposed to be standing. In the case of a stereo camera, the height of the point "a" may be estimated on the basis of an image distance to the point "a" and the angles α and β shown in FIG. 11.

As a different technique for height estimation, the robot 1 can move up and down the camera in the tilt direction, determine a point $a_1$ when a top point of the traveling object is accommodated in the screen, stores a relative angle $α_1$ from the camera optical axis and a camera posture $β_1$ at that time, determine a point $a_2$ when a bottom point of the traveling object is accommodated in the screen, store a relative angle $α_2$ from the camera optical axis and a camera posture $β_2$ at that time, and estimate the height of the traveling object by using them and a distance to the obstacle. The robot 1 may scan in the longitudinal direction by using a distance measuring sensor such as a laser range finder or a PDS (Position Sensitive Detector) sensor and estimate the height of the object on the basis of an elevation angle of the top end of the object and the height of the object.

Figure 10:
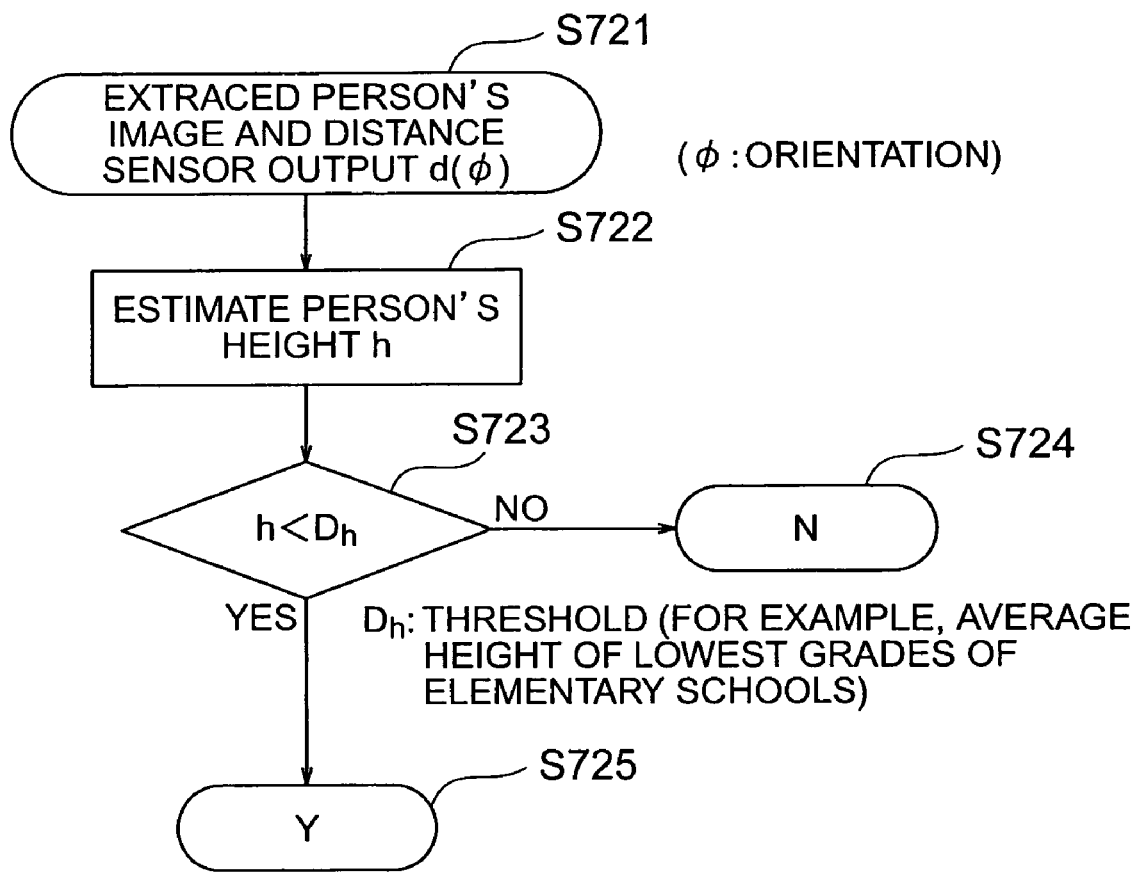
FIG. 10 is a flow chart for explaining a second human being's height estimation technique.
Figure 11:
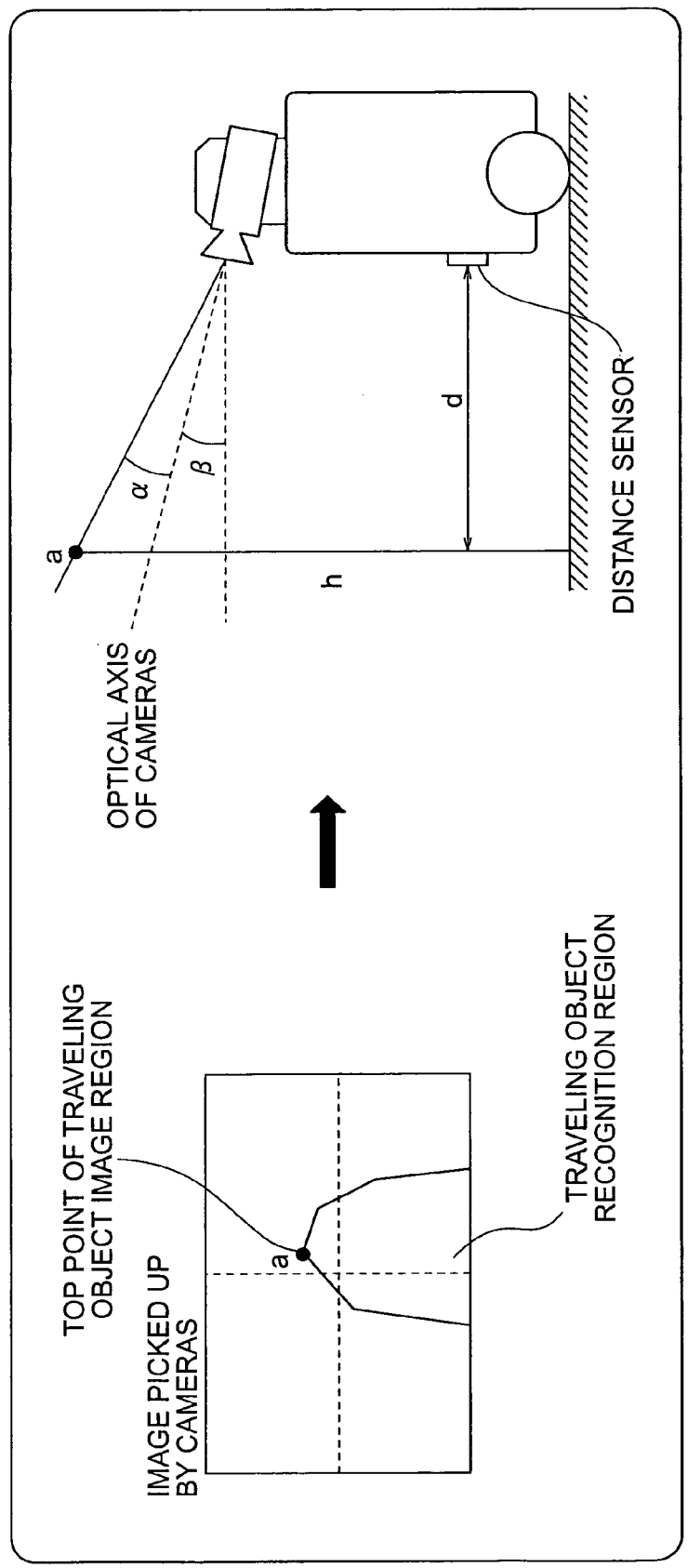
FIG. 11 is a diagram for explaining a second human being's height estimation technique.

The height h of the person thus estimated is compared with the threshold Dh at the step S723 shown in FIG. 10. If the height h is greater than the threshold Dh, then the robot 1 proceeds to step S724 and judges that the extracted person is not a person of caution level. In this case, the robot 1 further proceeds to step S8 shown in FIG. 2, places a limitation Lv. 3 on the approach permission distance L max of the robot 1 to the person, and sets the approach permission distance L max to L max =L 3 (>L 2).

On the other hand, if the height h is equal to or less than the threshold Dh, then the robot 1 proceeds to step S725 shown in FIG. 10 and judges that the extracted person is a person of high caution level, i.e., a person who is higher in caution level than general persons. In this case, the robot 1 further proceeds to step S9 shown in FIG. 2, sets the level of the approach permission distance limitation (degree of caution) of the robot 1 to the person to Lv. 4, and sets the approach permission distance $L_{max}$ to $L_{max}=L_4$ (>$L_3$).

By the way, the robot 1 uses the above-described decision techniques by switching the decision techniques according to the distance to the object. Specifically, if the traveling object is at a great distance and the resolution of the distance sensor or the encoder in the camera tilt direction is not obtained sufficiently, the person's height is estimated when the traveling object gets near a place located at a distance where the resolution of the distance sensor or the encoder in the camera tilt direction is obtained sufficiently. If the traveling object further gets near and the image is not accommodated in the screen, then the robot 1 moves the camera in the tilt direction, and estimates the height of the object person by using a relative angle in the screen and a camera posture angle. If the decision whether the traveling object is a human being is difficult under the influence of the illumination condition or background, then the robot 1 regards every detection traveling object as a human being, and makes a decision whether to set the caution level higher than that for the general person.

The robot 1 has a tracking function of providing a person with an identification code upon detecting the person and tracking the person with time. In the case of cameras, tracking utilizing feature points such as corner points or image edges is mounted. In the case of an area measuring sensor such as a laser sensor, tracking with due regard to the time continuity of location is mounted. If a state in which association with persons is difficult occurs in a confusion environment, then identification codes are given again and tracking is started again from that time point. It becomes possible to obtain time series information of person locations by thus tracking the persons. The robot 1 also has a decision technique of measuring a traveling operation frequency, a maximum traveling velocity and a maximum traveling acceleration of a person in the traveling plane and if these values are equal to or greater than the set thresholds, setting the level of degree of caution for the person higher than that for the general person.

The above-described decision technique is used mainly for the purpose of separating and extracting children from general persons. The robot 1 changes action restrictions according to a kind of an obstacle recognized on the basis of the decision procedure. Here, the caution levels are set so as to strengthen the restrictions in the detected obstacle order of a stationary obstacle, a traveling obstacle other than a human being, a traveling obstacle other than a child, and a child. They are arranged on the basis of large-small relations of a traveling velocity change value and a traveling velocity maximum change rate of the detected obstacle. If the detected obstacle is a stationary object, then the robot 1 can avoid it at a pace of itself and consequently the caution level becomes the lowest.

If the detected obstacle is a traveling obstacle such as a shopping cart, then there is a restriction in its traveling locus due to the constraint on the degree of freedom of wheels and a traveling prediction model having a high precision can be established. Although the level of the degree of caution needs to be made higher than that of a stationary object, therefore, the degree of caution can be set low among traveling objects.

On the other hand, from a kinematical viewpoint, there is a possibility that a human being will take a posture state in which the human being can travel in an arbitrary direction at arbitrary timing. As compared with a cart or the like, traveling prediction of the human being is difficult and the model precision also becomes low. Therefore, it is necessary to make the caution level for the human being high. Among human beings, prediction of the movement of a small child is difficult because the child starts to move in an unexpected direction suddenly. Therefore, the caution level of the child needs to be made high among human beings.

The robot 1 in the present embodiment compares a distance which can be ensured between the robot 1 and the obstacle with preset values (=0, L1, L2, L3 and L4) of the approach permission distance, and determines the traveling velocity of the robot 1 on the basis of a result of the comparison and preset levels of the approach permission distance limitation, i.e., levels of the degree of caution (=no limitations, Lv. 1, Lv. 2, Lv. 3 and Lv. 4). This traveling velocity is based on a traveling restriction law having two-dimensional matrix condition stipulations in which the distance to the obstacle is increased or the maximum traveling velocity is decreased as the caution level becomes higher as shown in FIG. 12. As a result, it becomes possible for the robot 1 to travel safely and efficiently even in a narrow place or a place crowded with persons.

On the other hand, in the conventional robot control, an action is taken with priority given to safety by always conducting handling in the worst case, i.e., in the supposed example, conducting handling in the same way as the case where a traveling object having a higher caution level is detected, when the robot 1 has detected some traveling object. As a matter of fact, however, the robot always detects something and stops if the robot attempts to travel in the store according to such an action law, resulting in poor efficiency.

According to the present embodiment, it is possible to provide a robot which conducts safe operation and has a high business capability in the store, and its control method as heretofore described.

In the present embodiment, a decision is made by using the height of the traveling object in order to detect a traveling object having a higher caution level. Alternatively, a different decision technique can also be used. For example, if a person detected by the robot 1 is entirely accommodated in a camera frame, the robot 1 may conduct circular shape matching with a contour line extracted from the traveling object, judge a region part which exists in an upper part of the traveling object and which is partitioned so as to have the highest correlation value to be a head of the person, and estimate the head and body on the basis of an image size ratio between the detected person's head and whole body.

If a person's face can be caught with a sufficient size in the image picked up by the cameras, the robot 1 can detect three-dimensional location relations of face parts such as the eyes, nose and mouth on the basis of the direction of the face and image features. The robot 1 finds correlation values with location relations of face parts obtained from average faces of respective age layers. Each of the average faces is obtained by standardizing and averaging face images of a plurality of persons in the same age layer in image processing by means of sizes. If an age layer having the highest correlation value is equal to or less than some threshold, here an average face of ten-year old children, the robot 1 also has a decision technique for setting the person higher in caution level than the general persons. If it is difficult to detect the face direction, it is also possible to make a decision on the basis of two-dimensional arrangement relations restricted to the front direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A robot, comprising:
   a main body;
   a traveling mechanism configured to be attached to the main body and to move the main body;
   an image pickup device configured to pick up an image of an object in a space including a traveling plane;
   an object detector configured to detect the object in the space based on the image picked up by the image pickup device;
   a distance calculator configured to calculate a distance to the object detected by the object detector;
   an obstacle decision part configured to make a decision whether the object detected by the object detector is an obstacle based on the distance to the object calculated by the distance calculator;
   a traveling object decision part configured to make a decision whether the obstacle is a traveling object based on the image picked up by the image pickup device and the distance calculated by the distance calculator, and to make a decision, if the obstacle is judged to be a traveling object, whether the traveling object is a person based on the image picked up by the image pickup device;
   a caution requiring person decision part configured to make a decision whether the traveling object is a person against whom caution should be taken, based on the image picked up by the image pickup device and the distance calculated by the distance calculator;
   an approach permissible distance setting part configured to set an approach permissible distance from the object detected by the object detector based on the image picked up by the image pickup device and the distance calculated by the distance calculator, the approach permissible distance setting part being configured to place no restrictions on the approach permissible distance from the object when the object detected by the object detector is not an obstacle, to set the approach permissible distance to a first distance when the object detected by the object detector is an obstacle and is not a traveling object, to set the approach permissible distance to a second distance greater than the first distance when the object detected by the object detector is a traveling object and is not a person, to set the approach permissible distance to a third distance greater than the second distance when the object detected by the object detector is a person and is not a person against whom caution should be taken, and to set the approach permissible distance to a fourth distance greater than the third distance when the object detected by the object detector is a person against whom caution should be taken, the approach permissible distance setting part being further configured to set a degree of caution with respect to the object, wherein the approach permissible distance setting part places no restrictions on the degree of caution when the object detected by the object detector is not an obstacle, sets the degree of caution to a first level when the object detected by the object detector is an obstacle and is not a traveling object, to set the degree of caution to a second level when the object detected by the object detector is a traveling object and is not a person, sets the degree of caution to a third level when the object detected by the object detector is a person and is not a person against whom caution should be taken, and sets the degree of caution to a fourth level when the object detected by the object detector is a person against whom caution should be taken;

a velocity setting part configured to set a velocity of the main body based on the approach permissible distance and the degree of caution set by the approach permissible distance setting part; and a controller configured to control the traveling mechanism so as to cause the traveling velocity of the main body to become the velocity set by the velocity setting part.

2. A control method for a robot including a main body, a traveling mechanism configured to be attached to the main body and to move the main body, an image pickup device configured to pick up an image of an object in a space including a traveling plane, an object detector configured to detect the object in the space based on the image picked up by the image pickup device, and a distance calculator configured to calculate a distance to the object detected by the object detector, the control method comprising:

making a decision whether the obstacle is a traveling object based on the image picked up by the image pickup device and the distance calculated by the distance calculator, and to make a decision, if the obstacle is judged to be a traveling object, whether the traveling object is a person based on the image picked up by the image pickup device;

making a decision whether the traveling object is a person against whom caution should be taken, based on the image picked up by the image pickup device and the distance calculated by the distance calculator;

setting an approach permissible distance from the object detected by the object detector based on the image picked up by the image pickup device and the distance calculated by the distance calculator, the setting of the approach permissible distance comprising:

placing no restrictions on the approach permissible distance from the object when the object detected by the object detector is not an obstacle, setting the approach permissible distance to a first distance when the object detected by the object detector is an obstacle and is not a traveling object, setting the approach permissible distance to a second distance greater than the first distance when the object detected by the object detector is a traveling object and is not a person, setting the approach permissible distance to a third distance greater than the second distance when the object detected by the object detector is a person and is not a person against whom caution should be taken, and setting the approach permissible distance to a fourth distance greater than the third distance when the object detected by the object detector is a person against whom caution should be taken;

setting a degree of caution with respect to the object, the setting of the degree of caution comprising:

placing no restrictions on the degree of caution when the object detected by the object detector is not an obstacle;

setting the degree of caution to a first level when the object detected by the object detector is an obstacle and is not a traveling object;

setting the degree of caution to a second level when the object detected by the object detector is a traveling object and is not a person;

setting the degree of caution to a third level when the object detected by the object detector is a person and is not a person against whom caution should be taken; and setting the degree of caution to a fourth level when the object detected by the object detector is a person against whom caution should be taken;

setting a velocity of the main body based on the approach permissible distance set by the setting of the approach permissible distance and the degree of caution set by the setting of the degree of caution; and controlling the traveling mechanism so as to cause the traveling velocity of the main body to become the velocity set by setting of the velocity of the main body.

3. A robot, comprising:

a main body;

a driving mechanism attached to the main body and configured to move the main body; and a camera, wherein the robot is configured to:

detect an object based on an image picked up by the camera;

calculate a distance to the detected object;

determine whether the detected object is an obstacle based on the calculated distance;

determine whether the obstacle is a traveling object based on the image picked up by the camera and the calculated distance, and, if the obstacle is determined to be a traveling object, determine whether the traveling object is a person based on the image picked up by the camera;

determine whether the traveling object is a person against whom caution should be taken, based on the image picked up by the camera and the calculated distance;

set an approach permissible distance from the detected object based on the image picked up by the camera and the calculated distance, wherein no restrictions are placed on the approach permissible distance from the object when the object is determined not to be an obstacle; the approach permissible distance is set to a first distance when the object is determined to be an obstacle, but not a traveling object; the approach permissible distance is set to a second distance greater than the first distance when the object is determined to be a traveling object, but not a person; the approach permissible distance is set to a third distance greater than the second distance when the object is determined to be a person, but not a person against whom caution should be taken; and the approach permissible distance is set to a fourth distance greater than the third distance when the object is determined to be a person against whom caution should be taken;

set a degree of caution with respect to the object, wherein no restrictions are placed on the degree of caution when the object detected by the object detector is not an obstacle, the degree of caution is set to a first level when the object detected by the object detector is an obstacle and is not a traveling object, the degree of caution is set a second level when the object detected by the object detector is a traveling object and is not a person, the degree of caution is set to a third level when the object detected by the object detector is a person and is not a person against whom caution should be taken, and the degree of caution is set to a fourth level when the object detected by the object detector is a person against whom caution should be taken; and set a velocity of the main body based on the approach permissible distance and the degree of caution.

\* \* \* \* \*